(12) United States Patent
Holbein et al.

(10) Patent No.: US 8,777,268 B2
(45) Date of Patent: Jul. 15, 2014

(54) REVERSIBLE BELT TENSIONER FOR VEHICLE OCCUPANT RESTRAINT SYSTEMS

(75) Inventors: Wolfgang Holbein, Alfdorf (DE); Artur Klein, Lorch (DE); Nathalie Kramer, Alfdorf (DE); Martin Prokscha, Schorndorf (DE); Stefano Roehm, Schorndorf (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/314,465

(22) Filed: Dec. 8, 2011

(65) Prior Publication Data
US 2013/0032653 A1 Feb. 7, 2013

(30) Foreign Application Priority Data
Mar. 1, 2011 (DE) .......................... 10 2011 011 777

(51) Int. Cl.
*B60R 22/46* (2006.01)

(52) U.S. Cl.
USPC ............ 280/806; 280/805; 297/468; 297/480

(58) Field of Classification Search
USPC ............... 280/806, 807, 801.2, 805; 297/468, 297/470, 474, 475
See application file for complete search history.

(56) References Cited

U.S. PATENT DOCUMENTS

| | | | |
|---|---|---|---|
| 3,077,324 A * | 2/1963 | Strickland, Jr. ........... | 244/122 B |
| 3,323,749 A * | 6/1967 | Reimertz ................... | 242/384.3 |
| 3,381,268 A * | 4/1968 | Boblitz ...................... | 180/270 |
| 3,522,918 A * | 8/1970 | Wrighton .................. | 244/122 R |
| 3,570,621 A * | 3/1971 | Hampton .................. | 180/270 |
| 3,797,603 A * | 3/1974 | Loomba ..................... | 180/268 |
| 3,881,667 A * | 5/1975 | Tandetzke ................. | 242/384.3 |
| 4,036,322 A * | 7/1977 | Takada et al. .............. | 297/477 |
| 4,162,715 A * | 7/1979 | Coulombe ................. | 280/801.1 |
| 4,347,442 A * | 8/1982 | White et al. .............. | 290/48 |
| 4,358,135 A * | 11/1982 | Tsuge et al. ................ | 280/806 |
| 4,508,288 A * | 4/1985 | Nilsson ..................... | 242/374 |
| 4,555,831 A * | 12/1985 | Otzen et al. ............... | 24/603 |
| 4,603,819 A * | 8/1986 | Loose et al. ............... | 242/379 |
| 4,785,679 A * | 11/1988 | Weber et al. ............... | 74/7 R |
| 4,913,497 A * | 4/1990 | Knabel et al. .............. | 297/480 |
| 4,944,530 A * | 7/1990 | Spurrier .................... | 280/801.1 |
| 5,056,739 A * | 10/1991 | LeVay ....................... | 244/122 AC |
| 5,149,134 A * | 9/1992 | Fohl .......................... | 280/806 |
| 5,284,307 A * | 2/1994 | Kotama ..................... | 242/374 |
| 5,328,118 A * | 7/1994 | Tokugawa et al. .......... | 242/374 |

(Continued)

FOREIGN PATENT DOCUMENTS

JP 04092744 A * 3/1992 ............. B60R 22/20

*Primary Examiner* — Nicole Verley
(74) *Attorney, Agent, or Firm* — Tarolli, Sundheim, Covell & Tummino LLP

(57) ABSTRACT

The invention relates to a reversible belt tensioner (10) comprising a drive motor (12), a spindle (14) connected to the drive motor (12), a spindle nut (16) adapted to be displaced in axial direction (18) on the spindle (14), a catch (20) the one end of which is connected to the spindle nut (16) and a belt buckle (22) connected to the other end of the catch (20), wherein at least one of the following features prevents the spindle nut (16) from jamming during travel against block:
- a cylindrical guiding portion (50) inside the spindle nut (16) interacting with the outer geometry of the spindle (14);
- a freewheel mechanism (48) between the drive motor (12) and the spindle (14);
- a compression spring (70) between the belt buckle (22) and a stop.

27 Claims, 4 Drawing Sheets

(56) References Cited

U.S. PATENT DOCUMENTS

| | | | |
|---|---|---|---|
| 5,628,216 A * | 5/1997 | Qureshi et al. | 70/278.7 |
| 6,065,704 A * | 5/2000 | Pywell et al. | 242/374 |
| 6,131,951 A * | 10/2000 | Chicken et al. | 280/806 |
| 6,145,881 A * | 11/2000 | Miller et al. | 280/806 |
| 6,239,401 B1 * | 5/2001 | McCardle et al. | 219/99 |
| 6,332,629 B1 * | 12/2001 | Midorikawa et al. | 280/806 |
| 6,454,306 B1 * | 9/2002 | Cunningham et al. | 280/806 |
| 6,523,769 B2 * | 2/2003 | Hamaue et al. | 242/374 |
| 6,669,131 B2 * | 12/2003 | Takehara et al. | 242/374 |
| 6,848,717 B2 * | 2/2005 | Bullinger et al. | 280/806 |
| 6,932,324 B2 * | 8/2005 | Biller et al. | 254/230 |
| 6,976,707 B2 * | 12/2005 | Modinger et al. | 280/806 |
| 7,178,835 B2 * | 2/2007 | Hippel et al. | 280/806 |
| 7,188,868 B2 * | 3/2007 | Yamaguchi | 280/806 |
| 7,240,924 B2 * | 7/2007 | Kohlndorfer et al. | 280/807 |
| 7,407,193 B2 * | 8/2008 | Yamaguchi et al. | 280/805 |
| 7,490,857 B2 * | 2/2009 | Tomita | 280/806 |
| 7,584,997 B2 * | 9/2009 | Bachmann et al. | 280/801.1 |
| 7,631,831 B2 * | 12/2009 | Hiramatsu | 242/374 |
| 7,717,215 B2 * | 5/2010 | Tanaka | 180/268 |
| 7,866,703 B2 * | 1/2011 | Spahn et al. | 280/806 |
| 7,967,339 B2 * | 6/2011 | Usoro et al. | 280/801.2 |
| 7,997,620 B1 * | 8/2011 | Dong et al. | 280/801.2 |
| 8,317,228 B2 * | 11/2012 | Mages | 280/806 |
| 8,430,058 B2 * | 4/2013 | Sakakibara et al. | 118/626 |
| 8,496,269 B2 * | 7/2013 | Holbein et al. | 280/806 |
| 2007/0145732 A1 * | 6/2007 | Stevens | 280/806 |
| 2007/0296198 A1 * | 12/2007 | Eberle et al. | 280/806 |
| 2009/0218803 A1 * | 9/2009 | Friedsmann et al. | 280/807 |

* cited by examiner

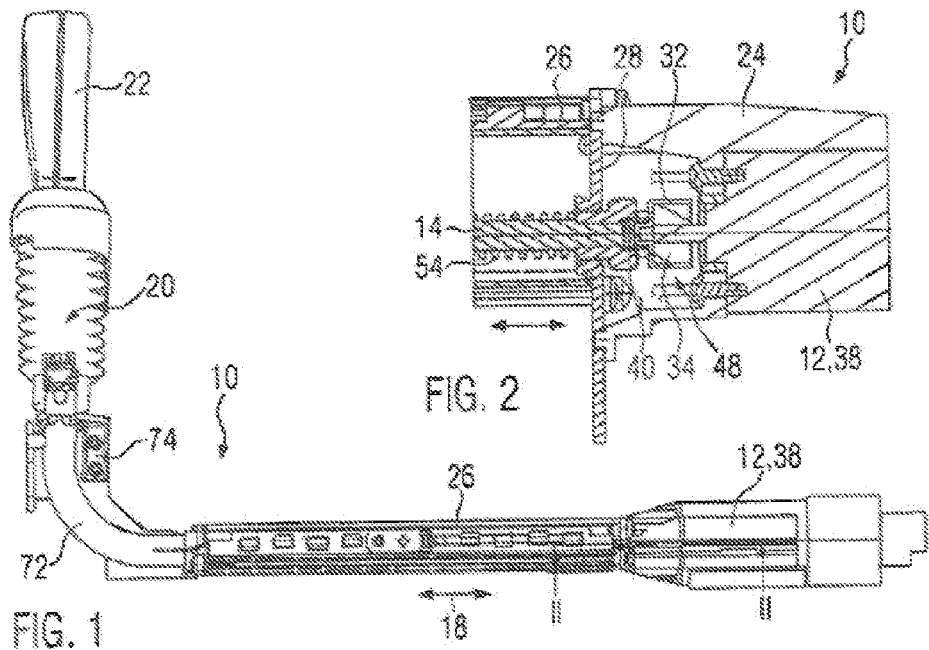
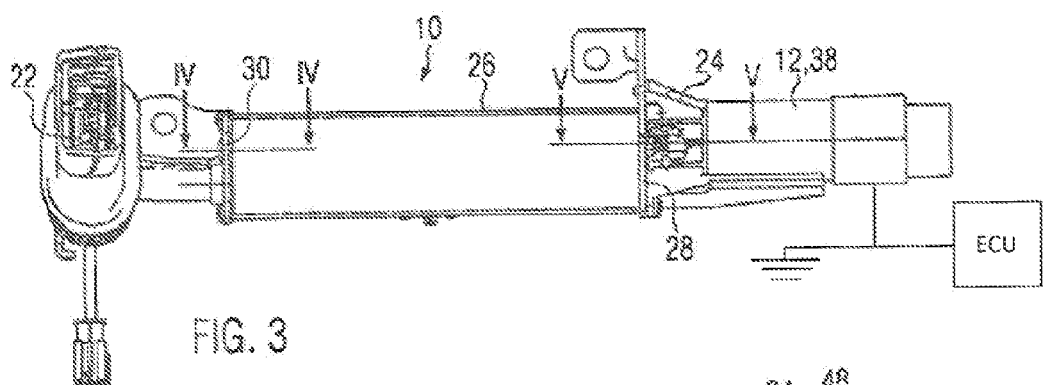
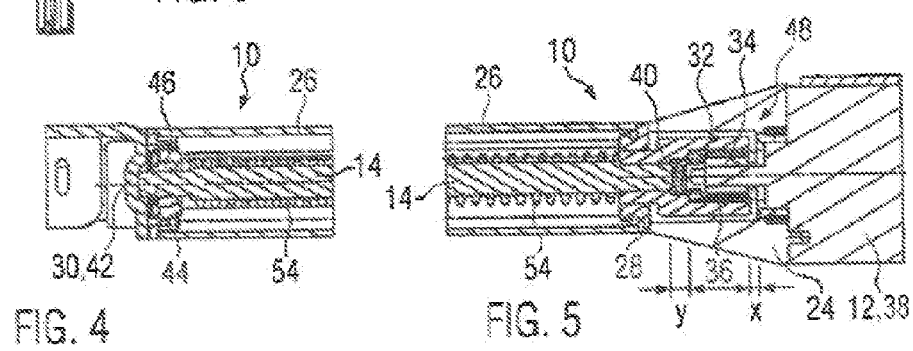

REVERSIBLE BELT TENSIONER FOR VEHICLE OCCUPANT RESTRAINT SYSTEMS

FIELD OF THE INVENTION

The invention relates to a reversible belt tensioner for vehicle occupant restraint systems comprising a drive motor, a spindle connected to the drive motor, a spindle nut adapted to be displaced on the spindle in axial direction, a catch the end of which is connected to the spindle nut and a belt buckle connected to the other end of the catch.

BACKGROUND OF THE INVENTION

In a reversible belt tensioner of this type the belt buckle of a vehicle seat belt can be moved by activation of the drive motor. Due to this possibility of movement, the belt tensioner can be used both as a belt buckle feeder when getting into the vehicle and for tensioning the seat belt before or upon collision of the vehicle. By virtue of the reversible design of the belt tensioner it is possible, as a matter of course, to reverse the movement during tensioning or feeding the belt buckle again by an opposite driving direction of the motor.

It is the object of the invention to provide a reversible belt tensioner exhibiting high functional safety and low susceptibility to failure and preferably causing as little operating noise as possible.

SUMMARY OF THE INVENTION

In accordance with the invention, this object is achieved by a reversible buckle tensioner of the type described in the beginning comprising at least one of the following features that prevents the spindle nut from jamming upon travel against block:
  a cylindrical guiding portion inside the spindle nut interacting with the outer geometry of the spindle;
  a freewheel mechanism between the drive motor and the spindle;
  a spring between the belt buckle and a stop.

By materializing one or more of said features the susceptibility to failure and/or the operating noise of the reversible buckle tensioner is reduced by preventing, for instance, the spindle nut from jamming upon traveling against block.

In an embodiment of the belt tensioner the spindle nut includes a female thread engaging in the spindle, the cylindrical guiding portion being arranged ahead of and/or behind the female thread viewed in axial direction. The diameter of the especially circular-cylindrical guiding portion can be adapted in this case exactly to the outer flanks of the spindle thread. Said outer flanks are subjected to lower dimensional tolerances than the toothing geometry and the threaded core so as to minimize clearance between the outer spindle diameter and the spindle nut. As the load-bearing part of the thread definitely decreases with an increasing axial thread length due to dimensional tolerances during manufacture of the thread, the load-bearing capacity and the breaking strength of the connection between the spindle and the spindle nut in axial direction are not significantly impaired by the axial reduction of the threaded engagement.

The axial length of the cylindrical guiding portion preferably is at least 25% of the length of the spindle nut. Starting from this length of the guiding portion, a considerable improvement of the guiding between the spindle and the spindle nut is brought about so that the risk of jamming is considerably reduced. The maximum length of the guiding portion depends on the required load-bearing capacity (including confidence coefficients) of the threaded connection and will usually be less than 50%.

In order to further minimize the risk of jamming of the spindle nut the freewheel mechanism can be configured in the way of a dog clutch, the dog clutch having a clearance within the magnitude of at least 45° upon reversal of the direction of rotation. Such clearance permits the drive motor to cover a particular distance during idling while accelerating the drive pinion. Only after covering such distance does the geometry of the drive pinion engage in a rotary catch of the spindle already at a particular velocity of the angle of rotation so that a greater torque can be applied to the spindle (breakaway torque) than in the case of a rigid connection between the drive motor and the spindle. Moreover, the dog clutch permits compensating an error of tolerance and angle.

In another embodiment of the belt tensioner the compression spring is arranged within the freewheel mechanism. This results in an especially compact design in which the compression spring contributing to noise damping is moreover supported to be protected against external influences.

The stop against which the spindle is biased by the compression spring is preferably disposed at the end of the spindle facing away from the drive motor.

The end of the spindle adjacent to said stop is preferably rounded. In this way an advantageous point contact between the spindle and its bearing position can be effectuated by simple means.

In order to materialize said point bearing alternatively also a ball can be pressed into the end of the spindle adjacent to the stop.

In a further embodiment of the belt tensioner the spindle can support on a motor flange of the drive motor, when it is displaced against the action of the compression spring. It is ensured on the basis of this support on the motor flange that the connection between the drive pinion of the drive motor and the spindle need not absorb any extraordinary axial forces which might damage the same.

In a further embodiment of the belt tensioner the compression spring provided between the belt buckle and the stop is arranged at the catch and is supported between the end fitting of the catch and a shell of the catch. This results in a rather "smooth" block travel as the spring is first compressed before traveling against block.

Preferably a motor current of the drive motor is monitored and the drive motor is turned off upon increase of the motor current which is indicative of reaching a stop. Especially when using an afore-mentioned compression spring a travel against block could thus be detected before the final stop is reached or the spring travel is fully exploited. The load of the component parts involved (spindle, spindle nut, bearing, clutch, drive motor . . . ) can thus be minimized.

In a further embodiment of the belt tensioner the electric insulation is formed by a receipt connected to a drive shaft of the drive motor of an electrically insulating material on which the spindle acts. This is advantageous as regards the electromagnetic compatibility and in addition reduces the operating noise of the belt tensioner.

Furthermore, the drive motor in this embodiment is preferably mounted to a casing by means of a motor flange of electrically insulating material.

For the rest, a ground connection of the drive motor can be connected to an electronic control unit. As a consequence, there is no ground contact to the vehicle which further improves the electromagnetic compatibility of the belt tensioner.

BRIEF DESCRIPTION OF THE DRAWINGS

FIG. 1 shows a longitudinal section across a belt tensioner according to the invention;

FIG. 2 shows a detailed section II-II across the belt tensioner according to FIG. 1;

FIG. 3 is a top view onto the belt tensioner according to FIG. 1;

FIG. 4 shows a detailed section IV-IV across the belt tensioner according to FIG. 3;

FIG. 5 shows a detailed section V-V across the belt tensioner according to FIG. 3;

DESCRIPTION OF THE EXAMPLE EMBODIMENT

Figure 6:
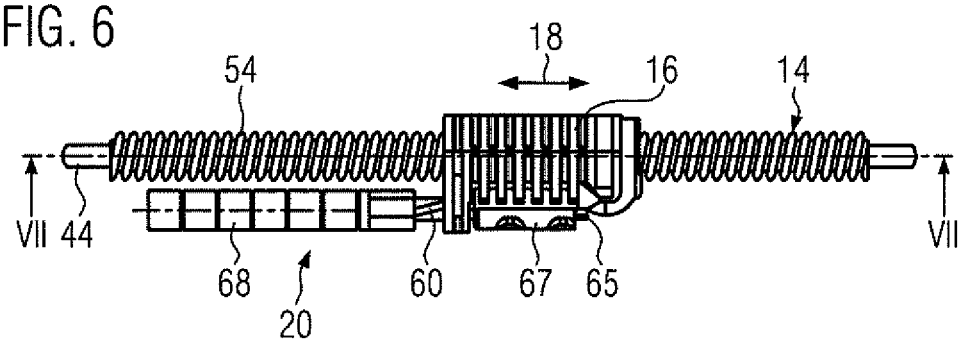
FIG. 6 is a top view onto a spindle, a spindle nut and part of a catch of the belt tensioner according to the invention.

The FIGS. 1 to 5 illustrate a reversible belt tensioner 10 for a vehicle occupant restraint system comprising a drive motor 12, a spindle 14 connected to the drive motor 12, a spindle nut 16 adapted to be displaced in axial direction 18 on the spindle 14 (cf. also FIGS. 6 to 8), a catch 20 the one end of which is connected to the spindle nut 16 (cf. also FIG. 6) and a belt buckle 22 connected to the other end of the catch 20.

It is clear from FIG. 2 that the drive motor 12 is fastened to a casing 26 by means of a motor flange 24. The belt tensioner 10 is mounted to the vehicle, especially to the vehicle body, through axial face walls 28, 30 of the casing 26.

The motor flange 24 is made of an electrically insulating material in the present embodiment. Further also an electric insulation 32 is provided between the drive motor 12, more exactly a drive pinion 34 of the drive motor 12, and the spindle 14, more exactly a rotary catch 36 of the spindle 14, this electric insulation 32 being discussed in more detail when describing the FIGS. 10 and 11.

For the rest, a ground of the drive motor 12 is connected to an electronic control unit (not shown).

Due to the afore-mentioned measures, the drive motor 12 and the motor casing 38 thereof are electrically insulated against the casing 26. There is no ground contact between the drive motor 12 and/or the motor casing 38 and the vehicle and/or the vehicle body. Consequently, this electric insulation 32 entails advantages as regards the electromagnetic compatibility (EMC).

The FIGS. 2 and 5 reveal a compression spring 40 biasing the spindle 14 in axial direction 18 against a stop 42, the stop 42 being formed at the end face 30 and thus arranged at the end of the spindle 14 facing away from the drive motor 12.

In order to realize an axial point bearing of the spindle 14 an end 44 of the spindle 14 adjacent to the stop 42 (cf. FIG. 4) is rounded. As an alternative, the end 44 of the spindle 14 adjacent to the stop 42 can also be formed by a ball (not shown) pressed into the spindle 14.

FIG. 4 further illustrates, in the area of the axial end 44 of the spindle 14, a radial bearing 46 having a spherical shape so as to compensate for angle errors.

The compression spring 40 loading the spindle 14 against the stop 24 is arranged within a freewheel mechanism 48 which will be discussed in more detail hereinafter by way of FIGS. 9 to 11. The compression spring 40 is thus advantageously guided axially through the freewheel mechanism 48 and is protected from external influences.

In accordance with FIG. 5, an axial distance x between the spindle 14, more exactly the rotary catch 36 of the spindle 14, and the motor flange 24 or motor casing 38 is smaller than the axial distance y between the spindle 14 and the electric insulation 32 connected to the drive pinion 34. In this way the spindle 14 can be supported on the motor flange 24 when it is displaced against the action of the compression spring 40. Accordingly, the connection between the drive pinion 34 and the spindle 14 is reliably protected against overload and damage of the electric insulation 32 is prevented.

Figure 7:
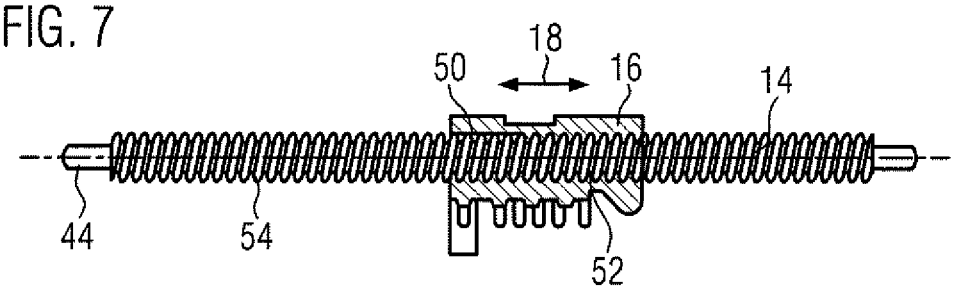
FIG. 7 shows a section VII-VII across the spindle and the spindle nut according to FIG. 6.
Figure 8:
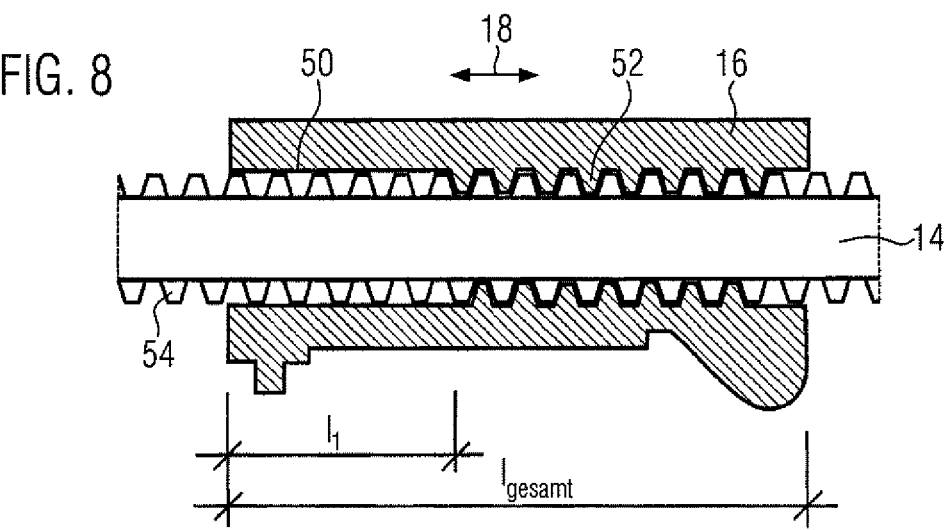
FIG. 8 shows a detail of the section of FIG. 7 in the area of the spindle nut.

The FIGS. 6 to 8 illustrate the spindle 14 and the spindle nut 16 movable on the spindle 14 in axial direction 18 in detail.

In the section of FIG. 7 and especially in the sectional detail of FIG. 8 it is clearly visible that inside the spindle nut 16 a non-toothed cylindrical guiding portion 50 is formed to interact with an external geometry of the spindle 14. The inner diameter of the cylindrical guiding portion 50 can be matched custom-fit to the outer flanks of a spindle toothing 54, said outer flanks being subjected to lower tolerances than the thread core and the geometry of the threaded teeth. Thus the cylindrical guiding portion 50 constitutes an excellent axial guide of the spindle nut 16 relative to the spindle 14 and reliably prevents the spindle nut 16 from tilting and thus jamming on the spindle 14.

Apart from the cylindrical guiding portion 50, the spindle nut 16 includes a female thread 52 engaging in the spindle toothing 54 of the spindle 14, wherein the cylindrical guiding portion 50 is arranged ahead of or behind the female thread 52, viewed in the axial direction 18.

An axial length $l_1$ of the cylindrical guiding portion 50 amounts to at least 25% of the length $l_{total}$ of the spindle nut 16 so as to provide an axial guiding substantially free of jamming between the spindle nut 16 and the spindle 14. When determining the axial length $l_1$ of the guiding portion 50, care has always to be taken, by the way, that the remaining female thread 52 of the spindle nut 16 has the required load-bearing capacity so as to be capable of reliably transmitting the occurring axial forces between the spindle 14 and the spindle nut 16.

Figure 9:
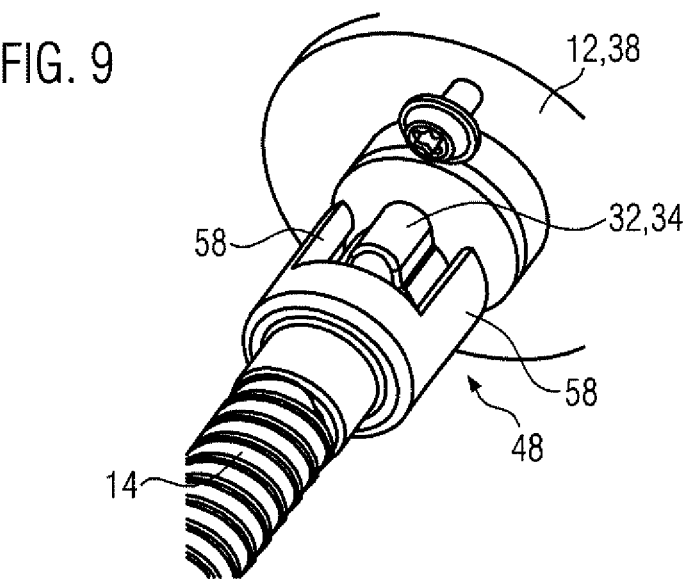
FIG. 9 is a perspective detailed view of the connection between the spindle and the drive motor of a belt tensioner according to the invention.
Figure 10:
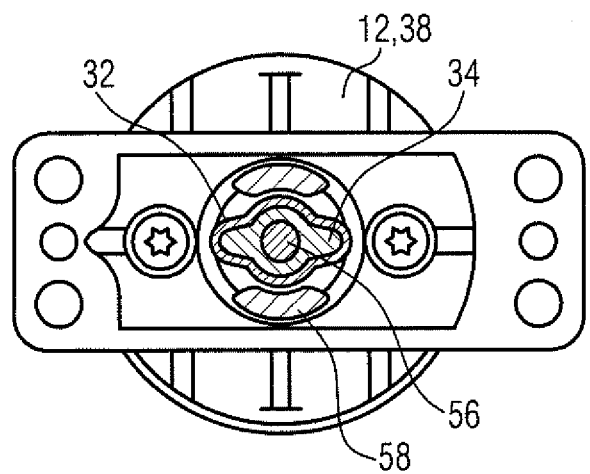
FIG. 10 shows a cross-section of the belt tensioner according to the invention in the area of the connection between the spindle and the drive motor.
Figure 11:
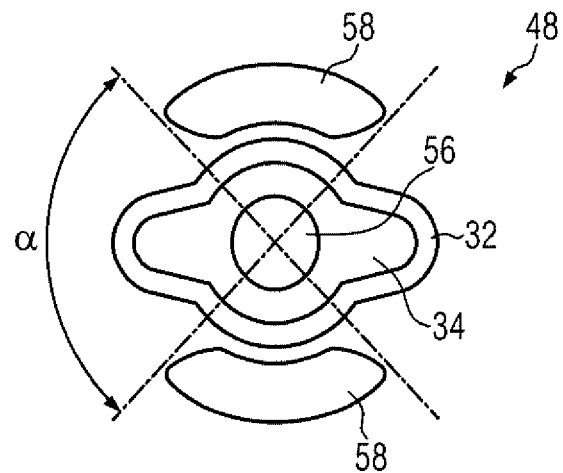
FIG. 11 shows a schematic detail of the freewheel mechanism between the drive motor and the spindle.

FIGS. 9 to 11 show the freewheel mechanism 48 between the drive motor 12 and the spindle 14 in detail. The freewheel mechanism 48 is configured in the form of a dog clutch having a clearance in the magnitude of at least 45° upon reversal of the direction of rotation.

In FIGS. 10 and 11 the drive pinion 34 connected to a motor shaft 56 for rotation therewith is shown which is adapted to catch the spindle 14 through claw-type spindle extensions 58 in a direction of rotation and thus constitutes the rotary catch 36. Upon reversal of the direction of rotation the freewheel mechanism 48 according to FIG. 11 has a clearance a with a 90°. Due to this clearance a of the freewheel mechanism 48 the drive pinion 34 can first be accelerated before catching the spindle 14 and therefore can apply a greater torque to the spindle 14 than in the case of a rigid connection between the drive pinion 34 and the spindle 14. Especially after travel against block the torque applied by the drive motor 12 then exceeds a "breakaway torque" as it is called and thus prevents the spindle nut 16 from jamming on the spindle 14. Moreover, the freewheel mechanism 48 in the form of a dog clutch also permits compensation of tolerances and angle errors.

In order to electrically insulate the drive motor 12 with its motor casing 38, as mentioned in the foregoing already, the electric insulation 32 is provided which is formed by a mount made of electrically insulating material. The electric insulation 32 is connected via the drive pinion 34 to the motor shaft 56 of the drive motor 12 and acts on the spindle 14 through the claw-type spindle extensions 58. According to the present embodiment, the drive pinion 34 is completely coated with the electric insulation 32 so that the spindle 14 is electrically insulated against the drive motor 12.

Figures 12, 13, 14:
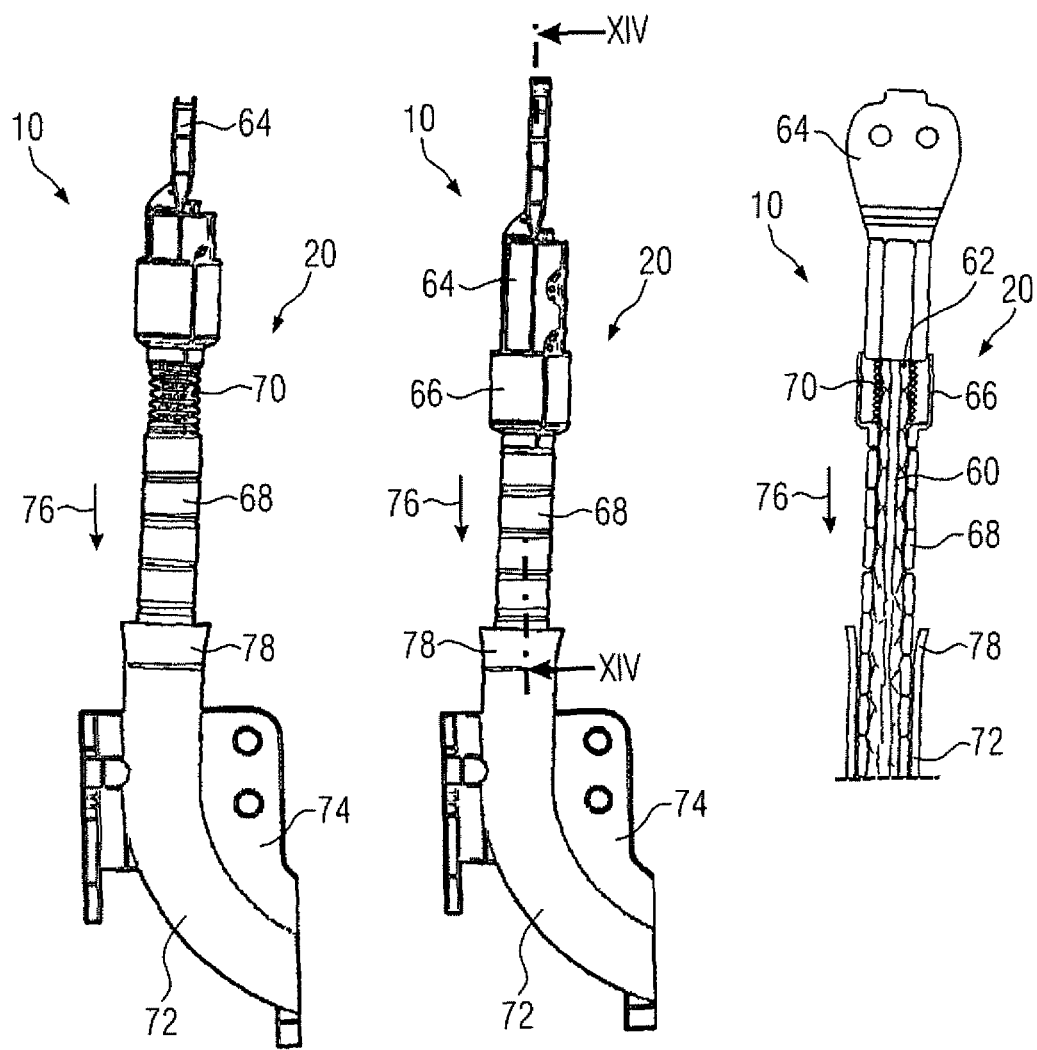
FIG. 12 shows a detail of the catch of the belt tensioner according to the invention in accordance with a design variant.
FIG. 13 shows a detail of the catch of the belt tensioner according to the invention in accordance with another design variant.
FIG. 14 shows a schematic section XIV-XIV across the catch according to FIG. 13.

FIGS. 12 to 14 illustrate details of the reversible buckle tensioner 10 in the area of the catch 20.

According to FIG. 14, the catch 20 includes a cable 60, especially a wire cable, connected and especially pressed to an end fitting 64 at one cable end 62. Later the belt buckle 22 is fastened to this end fitting 64. At an opposed cable end 65 a similar end fitting 67 is connected, especially pressed, to the cable 60, wherein said end fitting 67 is mounted on the spindle nut 16 (cf. FIG. 7).

The catch 20 further comprises a bushing 66 in the transition area between the end fitting 64 and the cable 60, a flexible link sleeve 68 enclosing the cable 60 and a compression spring 70 biasing the link sleeve 68 in the direction of the cable toward the spindle nut 16.

For guiding the cable 60 and the link sleeve 68 a tubular shell 72 tightly mounted on the vehicle body by means of fittings 74 is provided.

The bushing 66, the compression spring 70 and the link sleeve 68 are movable at least in the area of the cable end 62 in the direction of the cable relative to the cable 60.

When inserting the end fitting 64, i.e. a movement of the belt buckle 22 in the tensioning direction 76, the buckle tensioner 10 can be designed in geometry such that its end stop is not defined by the spindle nut 16 but by the bushing 66. For an outer diameter of the bushing 66 is larger than an inner diameter of the shell 72 so that an end 78 of the shell 72 constitutes a stop for the bushing 66 moved in the tensioning direction 76.

In the design variant according to FIG. 12, the compression spring 70 biases the bushing 66 against the end fitting 64 and the link sleeve 68 toward the spindle nut 16. Thus an undamped "hard" traveling against block takes place, whereas the design variant according to the FIGS. 13 and 14 permits a damped "smooth" traveling against block.

As is clearly visible in FIG. 14, in this case the compression spring 70 is not arranged between the bushing 66 and the link sleeve 68 but between the end fitting 64 and the bushing 66. The main function of the bushing 66, i.e. to protect sensitive cover members in the passenger compartment against sharp edges in the transition area between the cable 60 and the end fitting 64, is also satisfied in this design variant, just as the main function of the compression spring 70, i.e. to bias the link sleeve 68 toward the spindle nut 16.

In addition, the compression spring 70 according to FIGS. 13 and 14 serves for damping while traveling against block. If the belt buckle 22 is drawn in via the end fitting 64 pressed together with the cable 60 in the tensioning direction 76, the bushing 66 abuts against the end 78 of the shell 72 when the spindle 14 has a sufficient length. After that the cable 60 fixed to the spindle nut 16 as well as the end fitting 64 pressed together with the cable end 62 can be moved in the tensioning direction 76 opposite to the spring force of the compression spring 70. In other words, the stop of the reversible buckle tensioner 10 is designed to be damped, thereby the buckle tensioner 10 being largely prevented from jamming in the event of travel against block.

With a damped configuration of the stop as illustrated, for instance, in FIGS. 13 and 14, preferably a motor current of the drive motor 12 is monitored and the drive motor 12 is turned off upon increase in the motor current which is indicative of reaching the stop. The reaching of the stop can be detected by appropriate software as the current draw of the drive motor 12 slightly increases as soon as the drive motor 12 has to operate against the spring force of the compression spring 70. Consequently, a travel against block can be detected before the entire spring travel is exploited. Due to an immediate turnoff of the drive motor 12 the load of all buckle tensioner components involved (e.g. spindle 14, spindle nut 16, freewheel mechanism 48, drive motor 12 . . . ) can be minimized.

The afore-mentioned measures thus contribute in the most different fashion to preventing the buckle tensioner 10 from jamming while traveling against block. The cylindrical guiding portion 50 ensures improved guiding between the spindle 14 and the spindle nut 16, the compression spring 70 ensures stop damping when the belt buckle 22 moves in the tensioning direction 76, the compression spring 40 ensures stop damping when the belt buckle 22 moves opposite to the tensioning direction 76 and the freewheel mechanism 48 ensures an increased breakaway torque. The electric insulation 32 is usually made of a resilient, preferably elastic material so that by way of deformation an increased breakaway torque can equally be built up analogously to the principle of the freewheel mechanism 48. Primarily, however, the electric insulation 32 entails advantages as regards the noise damping and the electro-magnetic compatibility.

The invention claimed is:

1. A reversible belt buckle tensioner comprising
    a drive motor (12),
    a spindle (14) connected to the drive motor (12),
    a spindle nut (16) adapted to be displaced relative to the drive motor in axial direction (18) on the spindle (14),
    a catch (20) having a first end which is connected to the spindle nut (16),
    a belt buckle (22) connected to a second end of the catch (20); and
    a cylindrical guiding portion (50) inside the spindle nut (16) which interacts with only an outermost diameter of the spindle (14).

2. The belt tensioner according to claim 1, wherein the spindle nut (16) has a female thread (52) engaging in the spindle (14) and wherein the cylindrical guiding portion (50) is arranged at least one of ahead and behind the female thread (52) viewed in axial direction (18).

3. The belt tensioner according to claim 2, wherein the axial length ($l_1$) of the cylindrical guiding portion (50) amounts to at least 25% of the length ($l_{total}$) of the spindle nut (16).

4. The belt tensioner according to claim 1, further including an electric insulation (32) between the drive motor (12) and the spindle (14), wherein a mount connected to the drive pinion (34) of the drive motor (12) is made of an electrically insulating material, said mount acting on the spindle (14).

5. The belt tensioner according to claim 4, wherein the drive motor (12) is mounted on a casing (26) by means of a motor flange (24) made of electrically insulating material.

6. The belt tensioner according to claim 4, wherein a ground of the drive motor (12) is connected to an electronic control unit.

7. The belt tensioner according to claim 1, further including a freewheel mechanism (48) between the drive motor (12) and the spindle (14).

8. The belt tensioner according to claim 7, wherein a compression spring (40) of the freewheel mechanism (48) loads the spindle in axial direction against a stop and wherein the compression spring (40) is arranged inside the freewheel mechanism (48).

9. The belt tensioner according to claim 8, wherein the stop (42) is formed at a casing (26) and is adjacent to an end (44) of the spindle (14) facing away from the drive motor (12).

10. The belt tensioner according to claim 9, wherein the end (44) of the spindle (14) adjacent to the stop (42) is rounded.

11. The belt tensioner according to claim 9, wherein a ball is pressed into the end (44) of the spindle (14) adjacent to the stop (42).

12. The belt tensioner according to claim 8, wherein the spindle (14) can be supported on a motor flange (24) when it is displaced against the action of the compression spring (40).

13. The belt tensioner according to claim 7, wherein the freewheel mechanism (48) is designed in the form of a dog clutch having clearance in the magnitude of at least 45° upon reversal of the direction of rotation.

14. The belt tensioner according to claim 1, wherein a motor current of the drive motor (12) is monitored and the drive motor (12) is turned off upon increase in the motor current which is indicative of reaching a stop.

15. The belt tensioner according to claim 1, wherein the cylindrical guiding portion (50) is threadless.

16. The belt tensioner according to claim 1, further including a compression spring (70) between the belt buckle (22) and a stop.

17. The belt tensioner according to claim 16, wherein the compression spring (70) is supported between an end fitting (64) of the catch (20) and a shell (72) of the catch (20).

18. The belt tensioner according to claim 1, further including a freewheel mechanism (48) between the drive motor (12) and the spindle (14), and a compression spring (70) between the belt buckle (22) and a stop.

19. A reversible belt buckle tensioner comprising
a drive motor (12),
a spindle (14) connected to the drive motor (12),
a spindle nut (16) adapted to be displaced relative to the drive motor in axial direction (18) on the spindle (14),
a catch (20) having a first end which is connected to the spindle nut (16),
a belt buckle (22) connected to a second end of the catch (20); and
a freewheel mechanism (48) between the drive motor (12) and the spindle (14).

20. The belt tensioner according to claim 19, wherein the freewheel mechanism (48) is designed in the form of a dog clutch having clearance in the magnitude of at least 45° upon reversal of the direction of rotation.

21. The belt tensioner according to claim 19, further including an electric insulation (32) between the drive motor (12) and the spindle (14), wherein a mount connected to the drive pinion (34) of the drive motor (12) is made of an electrically insulating material, said mount acting on the spindle (14).

22. The belt tensioner according to claim 19, wherein a compression spring (40) of the freewheel mechanism (48) loads the spindle in axial direction against a stop and wherein the compression spring (40) is arranged inside the freewheel mechanism (48).

23. The belt tensioner according to claim 22, wherein the stop (42) is formed at a casing (26) and is adjacent to an end (44) of the spindle (14) facing away from the drive motor (12).

24. The belt tensioner according to claim 23, wherein the end (44) of the spindle (14) adjacent to the stop (42) is rounded.

25. The belt tensioner according to claim 23, wherein a ball is pressed into the end (44) of the spindle (14) adjacent to the stop (42).

26. The belt tensioner according to claim 22, wherein the spindle (14) can be supported on a motor flange (24) when it is displaced against the action of the compression spring (40).

27. The belt tensioner according to claim 19, further including a compression spring (70) between the belt buckle (22) and a stop.

\* \* \* \* \*